United States Patent
Hoenicka et al.

(10) Patent No.: US 10,240,908 B2
(45) Date of Patent: Mar. 26, 2019

(54) SENSOR AND METHOD FOR PRODUCING THE SENSOR

(75) Inventors: Reinhold Hoenicka, Ortenburg (DE); Sabine Schmideder, Wurmannsquick (DE); Gunter Schallmoser, Ruhstorf (DE)

(73) Assignee: MICRO-EPSILON Messtechnik GmbH & Co. KG, Ortenburg (DE)

( * ) Notice: Subject to any disclaimer, the term of this patent is extended or adjusted under 35 U.S.C. 154(b) by 838 days.

(21) Appl. No.: 13/463,335

(22) Filed: May 3, 2012

(65) Prior Publication Data

US 2012/0299585 A1  Nov. 29, 2012

(30) Foreign Application Priority Data

May 23, 2011 (DE) .................. 10 2011 102 952
Jun. 9, 2011 (DE) .................. 10 2011 105 172
Sep. 12, 2011 (DE) .................. 10 2011 112 826

(51) Int. Cl.

| | |
|---|---|
| *G01B 7/02* | (2006.01) |
| *H01F 17/04* | (2006.01) |
| *H01F 27/30* | (2006.01) |
| *G01B 7/00* | (2006.01) |
| *H01F 27/32* | (2006.01) |
| *H01F 27/245* | (2006.01) |

(52) U.S. Cl.
CPC .............. *G01B 7/003* (2013.01); *G01B 7/023* (2013.01); *H01F 17/04* (2013.01); *H01F 27/306* (2013.01); *H01F 27/327* (2013.01); *H01F 27/245* (2013.01)

(58) Field of Classification Search
None
See application file for complete search history.

(56) References Cited

U.S. PATENT DOCUMENTS 5,479,695 A  *  1/1996  Grader ............... H01F 17/0033
                                                             156/89.28
5,598,135 A  *  1/1997  Maeda ............... H01F 17/0013
                                                             336/200
5,900,797 A      5/1999  Dougauchi
(Continued)

FOREIGN PATENT DOCUMENTS

CN  2281522 Y  5/1998
CN  1856846 A  11/2006
(Continued)

OTHER PUBLICATIONS

The State Intellectual Property Office of the People's Republic of China, First Office Action for Application No. 201210162899.8, dated Sep. 23, 2014, 17 pages, China.
(Continued)

*Primary Examiner* — Paresh H Patel
(74) *Attorney, Agent, or Firm* — Alston & Bird LLP

(57) ABSTRACT

An inductively operating sensor, particularly for measuring distances and positions of a metallic object, comprising at least a coil, a ferromagnetic or ferritic core and perhaps a housing comprising a sensor element, with the core being embedded in a single or multi-layered ceramic and jointly with the ceramic forming a coil body and with the coil body and the core being connected to each other in a form-fitting fashion. Furthermore, a method is suggested for producing such a sensor.

17 Claims, 10 Drawing Sheets

(56) References Cited

U.S. PATENT DOCUMENTS

Figure 1C:
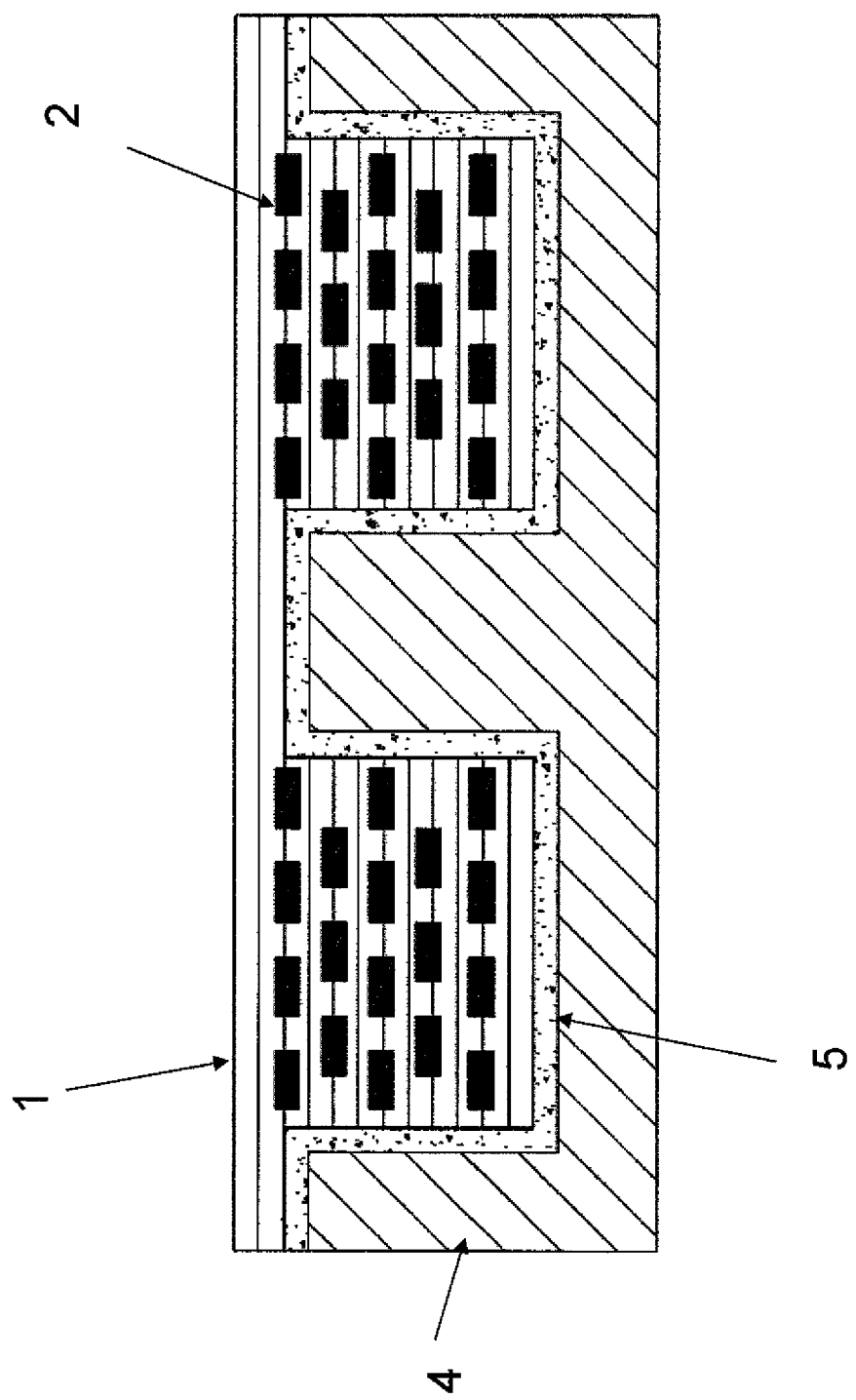

| | | | |
|---|---|---|---|
| RE39,453 E * | 1/2007 | Boytor | ............ H01F 27/292 |
| | | | 29/602.1 |
| 7,417,523 B2 | 8/2008 | Waffenschmidt et al. | |
| 8,474,314 B2 | 7/2013 | Neuburger et al. | |
| 8,695,208 B2 | 4/2014 | Matz | |
| 8,729,887 B2 | 5/2014 | Suzuki et al. | |

FOREIGN PATENT DOCUMENTS

| | | | | |
|---|---|---|---|---|
| CN | 102055295 A | 5/2011 | | |
| DE | 102007028239 A1 | 1/2009 | | |
| DE | 102008016829 A1 | 10/2009 | | |
| DE | 102011109553 A1 * | 2/2013 | ............ | G01D 5/20 |
| WO | WO 2011/020580 A2 | 2/2011 | | |

OTHER PUBLICATIONS

German Patent and Trade Mark Office, Office Action for Application No. 102011112826.7, dated Sep. 29, 2014, 6 pages, Germany.
Wei, Huang Zhi, "National Undergraduate Electronic Design Contest—Skills Training", Feb. 2007, pp. 21-25, Beijing University of Aeronautics and Astronautics Press, China.

* cited by examiner

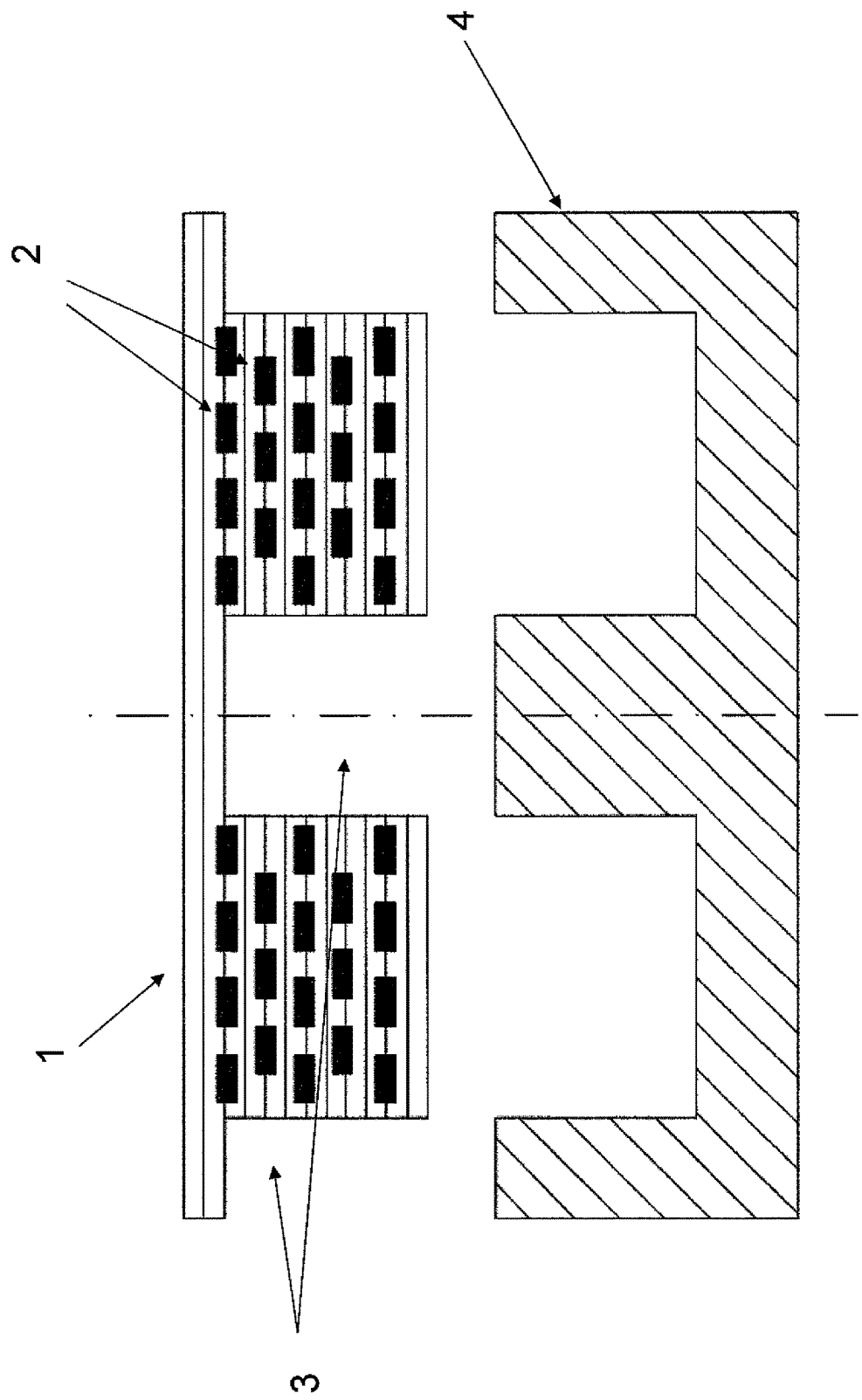

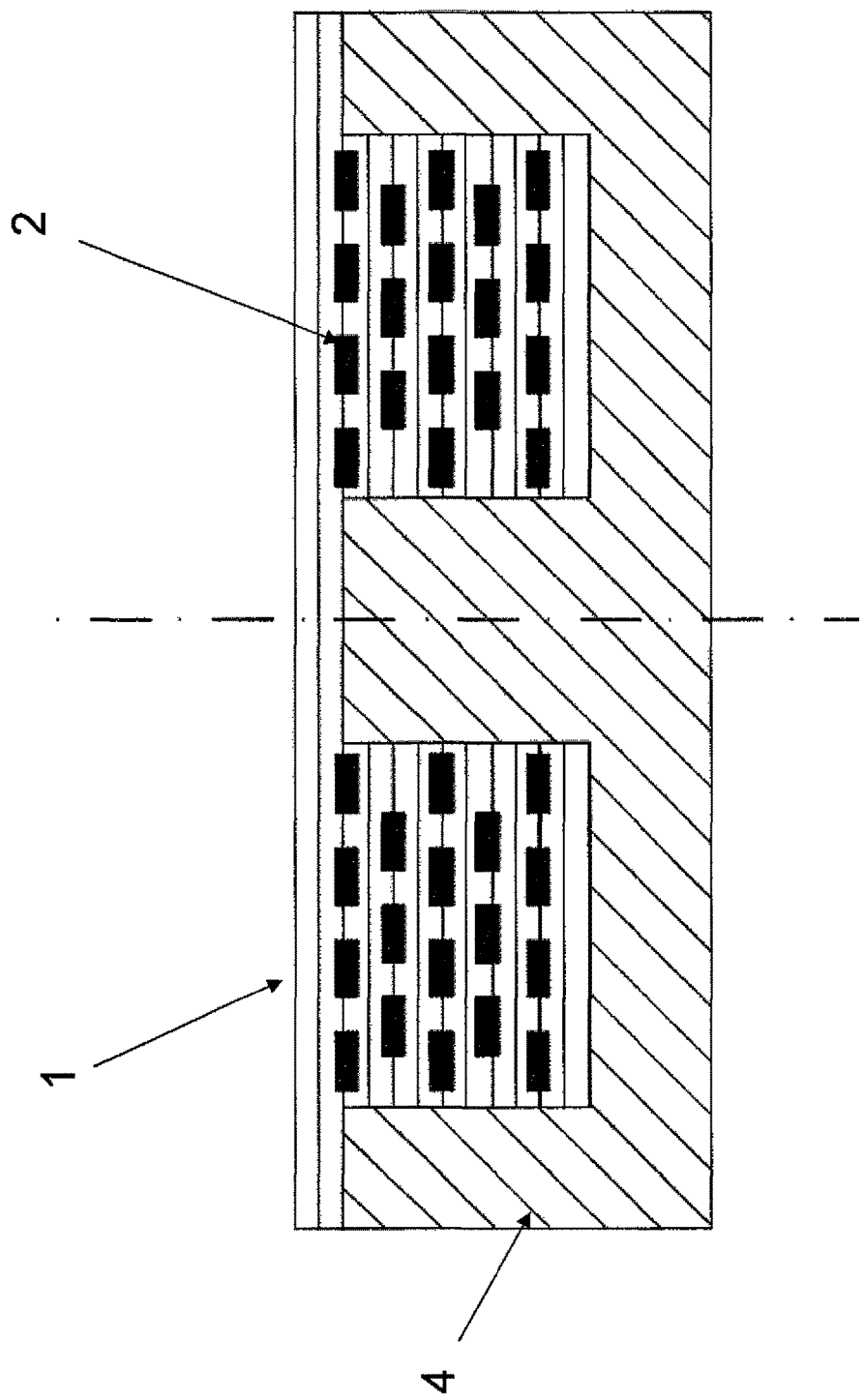

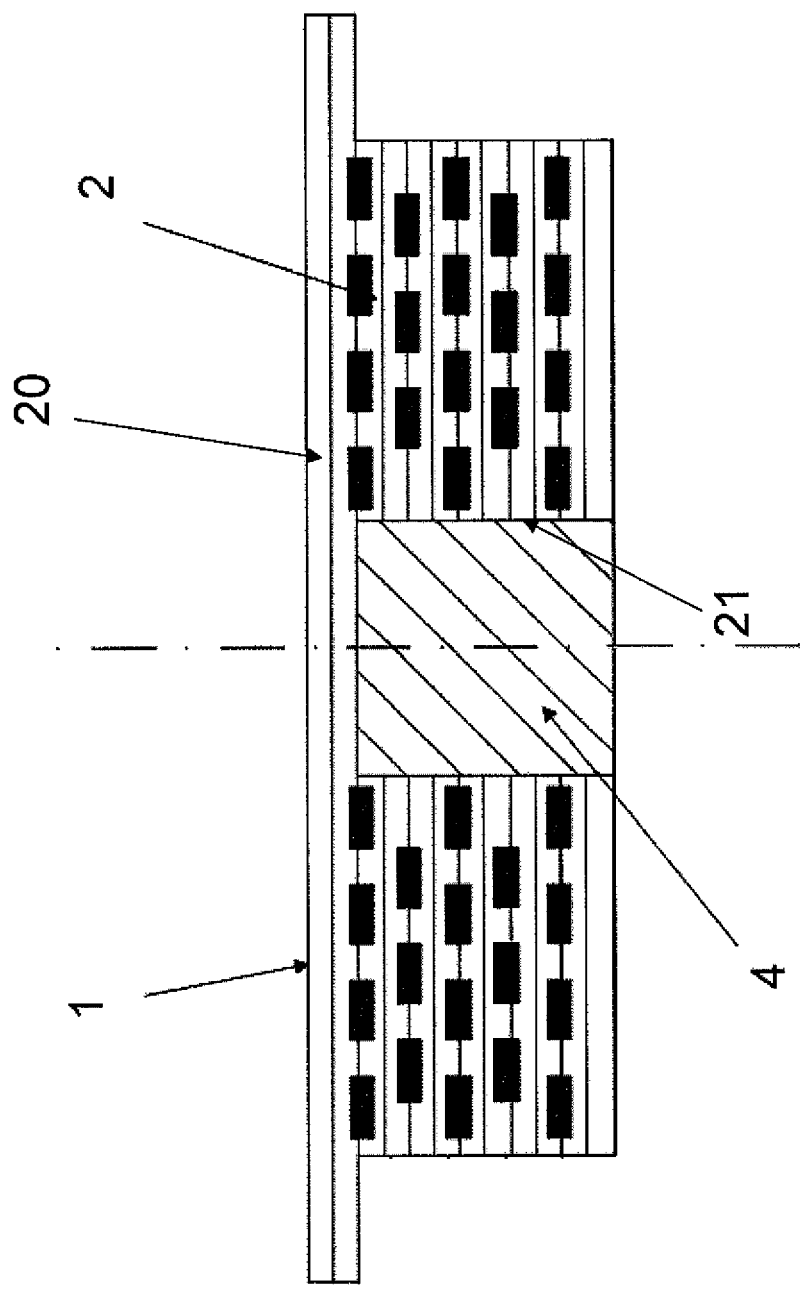

SENSOR AND METHOD FOR PRODUCING THE SENSOR

CROSS-REFERENCE TO RELATED APPLICATIONS

This application claims the benefit of German Patent Application Serial No. 10 2011 102 952.8, filed May 23, 2011; German Patent Application Serial No. 10 2011 105 172.8, filed Jun. 9, 2011; and German Patent Application Serial No. 10 2011 112 826.7, filed Sep. 12, 2011, all of which are hereby incorporated herein in their entirety.

BACKGROUND OF THE INVENTION

The invention relates to an inductively operating sensor, particularly for measuring distances and positions of a metallic object.

Inductive sensors are used in many technical fields for measuring tasks, monitoring machines and devices, or for process automation. Generally it is distinguished between simple switching sensors and continuous distance sensors. The first ones are also called proximity switches, because in case a metallic object approaches they produce a switching signal at a certain distance. The second group however delivers a continuous, distance-related signal when an object approaches, thus these sensors are used for measuring distances and positions.

Inductive sensors essentially comprise at least one coil fed with alternating power. When a metallic object approaches this coil there are essentially two effects. Eddy currents are induced in the metal, which counteract the original excitation (Lenz rule) and which create an internal feedback in the coil. This effect occurs primarily in objects made from electrically well conducting materials, regardless of if they are or are not ferromagnetic. In case of ferromagnetic objects an additional effect occurs. When an object made from a ferromagnetic material approaches the coil its inductivity changes, which can also be used to detect the object.

Frequently a ferromagnetic core is used for inductive sensors, in order to increase the inductivity of the coil. Additionally, the electromagnetic field of the coil can be guided through the core, yielding greater measuring and switching distances.

Eddy current sensors represent a special form of inductive sensors, operating without a core. Due to the lower inductivity of the coil they must be operated with considerably higher frequencies than the inductive sensors comprising a core.

Inductive sensors in the narrow sense require a ferromagnetic core, which increases the inductivity of the coil and guides the electromagnetic field. Very frequently, pot cores are used in these sensors showing an E-shaped cross-section. The pot core has a recess accepting the coil. By the E-shaped cross-section the coil is surrounded with ferromagnetic material except for the facial side, which leads to a very efficient field alignment. Here, flux lines overwhelmingly exit at the face so that the measuring field is guided towards the measuring object. However there are different core shapes, adjusted depending on their application. The simplest core comprises a cylindrical coil body with the coil being wrapped around it. Very frequently the core comprises a ferrite body produced by way of sintering of compressing powdered ferrite. It is disadvantageous in these cores that the material is very brittle and can easily break after sintering. Additionally, any subsequent processing is no longer possible or only with expensive production technology.

The coil of conventional sensors comprises copper wire, either wound in the form of an air-core coil or onto a coil body made from a non-metal. Other embodiments of coils are also known. For example, flat coils are used based on circuit boards. Here, the coil is a circuit board track applied onto a circuit board or flat foil. In order to increase inductivity, several layers may also be formed in the circuit board comprising a coil by connecting the layers of the coil via feed-through contacts. Particularly advantageous for high-temperature applications are coils with multi-layer ceramic substrates. Using this so-called LTCC [low-temperature cofired ceramics] technology or HTCC [high-temperature cofired ceramics] technology, several layers of ceramic substrates can be connected by way of sintering in order to form a compact block. Prior to sintering, the circuits and coils can be applied onto the individual layers of the ceramic films and connected via feed-through contacts. After sintering the coil comprises a compact block, which resists high mechanic and thermal stress.

The coil is connected to the electronic, which commonly is arranged in the sensor housing. The electronic comprises an oscillator, creating alternating voltage, and demodulates the signal of the coil. For evaluation purposes, either the amplitude, the frequency, the phase, or a combination of these parameters may be used.

Due to the touchless active principle, inductive sensors are used here because there is no feedback to the measuring object. Accordingly, they are used in difficult, rough environmental conditions. Dust, dirt, water, oil, or other contaminants have no influence upon the measuring signal. However in order to protect the sensor from these environmental influences the coil must be encapsulated. This occurs in simple sensors via plastic caps. In case of more difficult environmental conditions sensors are used with their housing being entirely made from stainless steel. In these full-metal sensors it is disadvantageous, though, that the stainless steel housing pre-energizes the sensor because eddy currents are also induced in stainless steel. Here, the sensitivity of these sensors is reduced in reference to sensors with a plastic cap. Alternatively, ceramic caps are also used which have no influence upon the measuring signal and are robust against external influences. Here, the ceramic cap covers the face of the sensor with the ferrite core and the coil being located thereunder. In order to prevent losing too much of the measuring range the cap may not be excessively thick. Here, it is disadvantageous that they are difficult in their formation and particularly in case of shock or under the stress of vibrations they can easily break.

The design of conventional inductive sensors therefore comprises several components of different materials, which must be assembled in a production process. Here, the materials stainless steel, plastic, ceramics, ferrite, copper wire, as well as electronic circuit board must be combined with each other fixed and lastingly. Usually these different components are molded to the housing via a casting compound. Particularly in case of difficult environmental conditions, such as dirt, dust, aggressive media, excess pressure or a vacuum, at high or low temperatures, under the stress of shock or vibrations it is difficult to lastingly seal the sensor and protect it from these environmental conditions. In case of changing temperatures the different expansion coefficients of these materials must be considered as well. This can lead to high tensions and relative motions of the individual components in reference to each other, which falsifies the measurements and/or the switching distance. Further, connections may sever under changing temperatures. Under the stress of shock or vibrations the different materials may resonate and break. Here, particularly the soldering spots of the wire coil and/or the connections are threatened. The ferrite core of the coil can also break easily. Due to the multi-part design combining different materials there are numerous problematic zones, which particularly may break in rough environments or may fail otherwise. Additionally, the design is complex and requires high production expenses.

The present invention is therefore based on the objective to embody and further develop a generic inductively operating sensor such that it yields a high level of reliability with a robust design. It shall be suitable for difficult environments and produced with a simple design and cost-effectively. The method shall be particularly suitable for the production of such a sensor.

The above-stated objective is attained in the features of the independent claims provided herein.

The sensor according to the invention comprises at least a coil, a ferromagnetic or ferrite core, and perhaps a housing, with the coil and the core forming the sensor element. The coil is embedded in a single or multi-layer ceramic and forms together with the ceramic a coil body. The coil body and the core are connected fixed to each other in a form-fitting fashion.

The method according to the invention is wherein the coil body is connected fixed to the core. In order to realize such a fixed connection it is essential that between the coil body and the core an adjustment is made with regards to geometry, namely in order to realize an engagement of the coil body and the core in a form-fitting manner, to the extent possible. The mutually adjusted geometries are here of particular importance.

According to the invention it has been recognized that a particularly compact and here robust design of the sensor can be realized such that the coil body encompassing the coil and the ceramic is connected to the core in a fixed fashion, namely such that the coil body literally encompasses the core or inversely the core encompasses the coil. A mutual encompassing or even a mutual penetration of the coil body and the core may be realized in light of the invention.

Within the scope of a first variant, the coil body is embodied in a closed fashion and used in a core embodied as a cup core. Here, the coil body may be formed like a chip, a pill, etc. in a monolithic fashion, with the coil body overall being accepted by the cup core and here being anchored and/or fastened in a fixed fashion.

Within the scope of another embodiment the coil body comprises a recess and/or indentation, into which the core can be inserted, regardless of its production method and the material it comprises. The recess and/or the indentation serving to accept the coil body may show many different cross-sections, for example a circular, oval, triangular, square, and/or rectangular cross-section.

Furthermore, it is possible that the coil body comprises a central recess at least at the side facing away from the measurement and that the core overall or partially is inserted into said recess, for example in the form of a pin, from the side facing away from the measurement, i.e. from the rear. Here, too, a fixed connection is of particular importance.

It is essential that the core is connected fixed to the coil body, for example inserted fixed into a recess of the coil body. For this purpose it may be pressed and/or glued and/or molded and/or soldered into the recess as a molded body, with soldering via active brazing being particularly suitable.

Alternatively and within the scope of a particularly advantageous embodiment the core may also comprise sintered ferromagnetic powder or powdered ferrite, with it here being produced in situ, namely in a sintered form with an inserted coil body. The formation by sinter technology may occur jointly with the single or multi-layered ceramic in order to embed the coil such that right from the start a particular design of the entire component is possible.

With regards to good adhesion of the core in reference to the core body it is further advantageous if the powdered ferrite intended for the embodiment via powder technology is mixed with glass powder, resulting in a beneficial situation at the boundaries in reference to the coil body.

The housing or a part thereof may here be defined by the sintered form. This too represents an alternative embodiment.

Different core types may be used, for example a cup core, a P-core, a PM-core, an E-core, etc. Any commercial embodiment of suitable cores is possible, here, and may be used depending on the requirements.

The core may comprise a material with high permeability, for example ferromagnetic films and/or Mu-metal foils, stacked and/or layered over top of each other.

With regards to the sensor element it shall be remarked once more that it comprises the coil and the core. This sensor element may form at least a portion of the housing. Additionally, it is possible that the sensor element is connected to the housing and/or the core via active brazing. Any suitable connection technologies leading to a fixed connection are possible, here.

Particularly advantageous, the face of the sensor element is embodied as a planar, continuous ceramic surface. The face of the sensor element may form a part of the housing, namely the housing lid.

It is also possible that the face of the sensor element is an integral component of a coil body created by way of sintering technology, with the surface at the measuring side being particularly shaped prior to sintering according to the surface features of the object.

A ceramic cover may be provided at the side facing away from the measurement, i.e. at the rear of the sensor and/or the sensor element, similar to the measuring and/or front side.

With regards to concrete applications it is important that the sensor according to the invention comprises a sensor element and the coil is embedded in a multi-layered ceramic. The coil is printed onto the unsintered "green" ceramic film (e.g., Dupont GreenTape™ 951) prior to sintering or via embossing punch and doctor. Several layers of film are then precisely stacked on top of each other and sintered at temperatures ranging from 800 . . . 900° C. (LTCC) or 1600 . . . 1800° C. (HTCC). The advantage of LTCC is the fact that due to the lower temperature easier material systems can be used with high conductivity for the printing of the circuit boards. Methods known from standard thick-layer processes can be used.

The ceramic films of the sensor are designed such that an almost planar area develops at the face. Towards the rear the sensor element is embodied such that a ferrite core can be inserted. For this purpose, the sensor element comprises outside the coil a circular or rectangular recess which can accept the core. According to the invention it is particularly advantageous for the ferrite core to enter into a fixed connection with the sensor element. When suitable material has been selected, here a compact, fixed unit can be yielded comprising the sensor element and the core, which can either be inserted into a metallic housing or itself serves as such a housing. Simultaneously the coil and the core are fixed in reference to each other such that no relative motion can occur between them. This way, any signal disturbances are avoided which otherwise might occur due to a microphone effect.

The sensor according to the invention therefore forms a compact unit, which due to the ceramic face and the massive design can particularly be used in rough environmental conditions. The face forms a continuous ceramic area without interruptions, which is usually shaped as planar as possible. The core might also be completely integrated in the ceramic sensor element, namely by a ceramic cover also being applied at the rear of the core. This way a monolithic, ceramic block develops, in which the coil and the core are protected and hermetically sealed from environmental influences.

The ceramic face is particularly advantageous because here additional covers (plastic or ceramic caps, stainless steel covers, etc.) can be waived. This way the coil is located very close to the face of the sensor, thus expanding the measuring range in reference to sensors of prior art.

For particular applications the ceramic may also be shaped prior to sintering, for example bulged, so that it is adjusted to particular surface features of the measuring object. This may occur for example for the measuring of arched or round surfaces, such as spheres, cylinders, tubes with a convex or concave shape. Due to the surface adjustment here an expanded measurement range is yielded.

Additionally the sensor comprises only few components, which are assembled easily and cost-effectively. Due to the small number of components the reliability of the entire sensor is increased as well. The ceramic sensor element can be connected to the housing of the sensor via adhesion, compression, molding, or soldering. Active brazing is particularly advantageous, allowing a hermetically sealed connection between the ceramic element and the metal housing.

Figure 2:
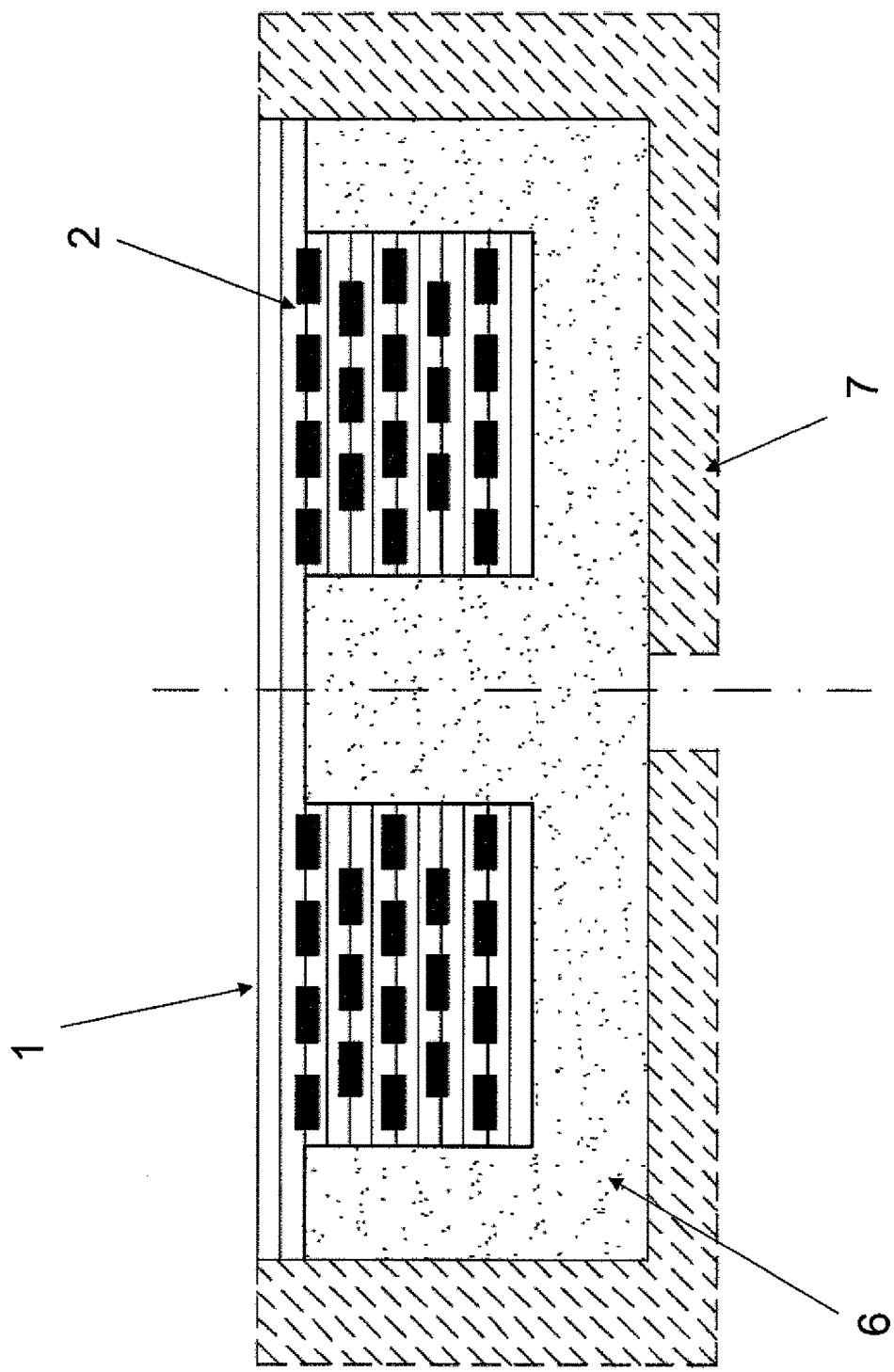
Figure 3:
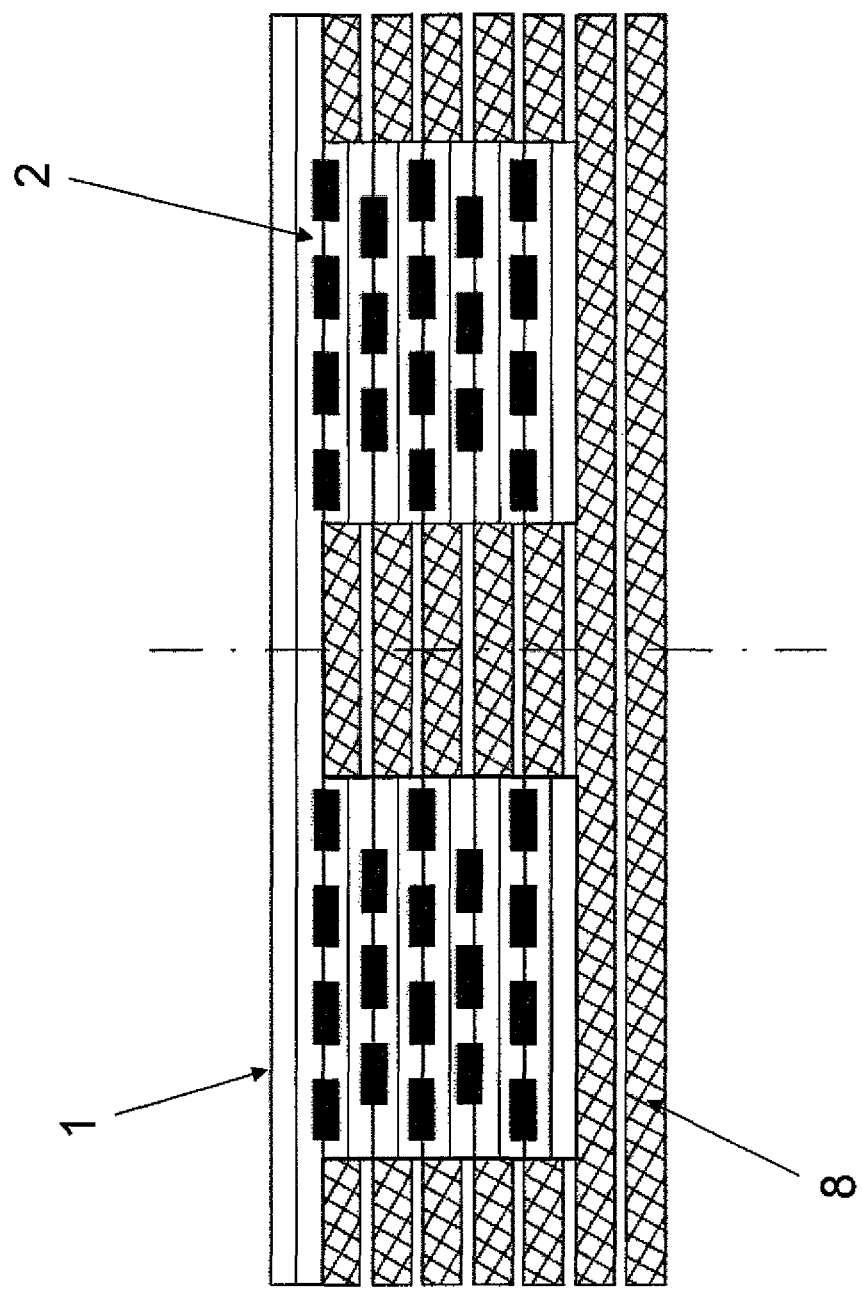
Figure 4:
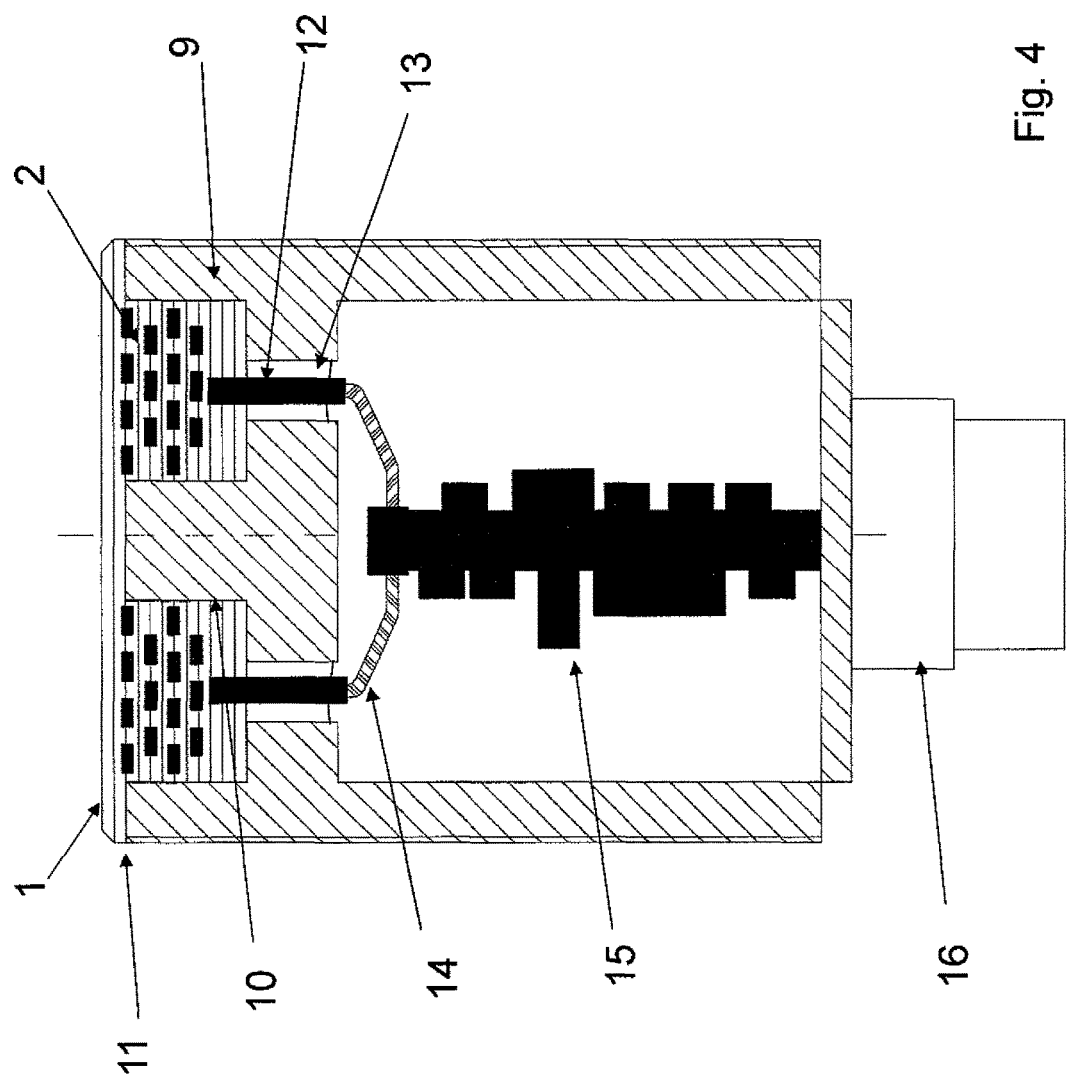
Figure 5:
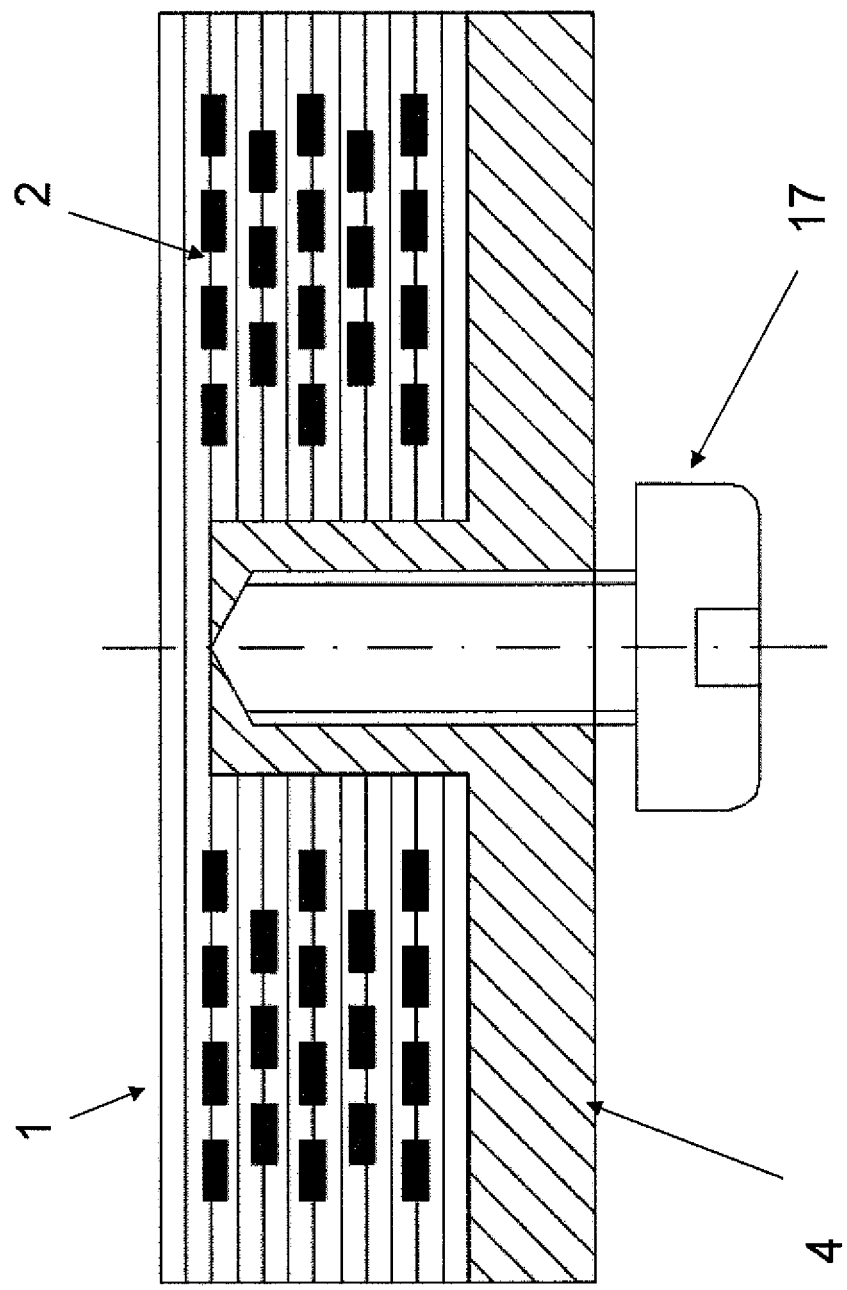
Figure 6:
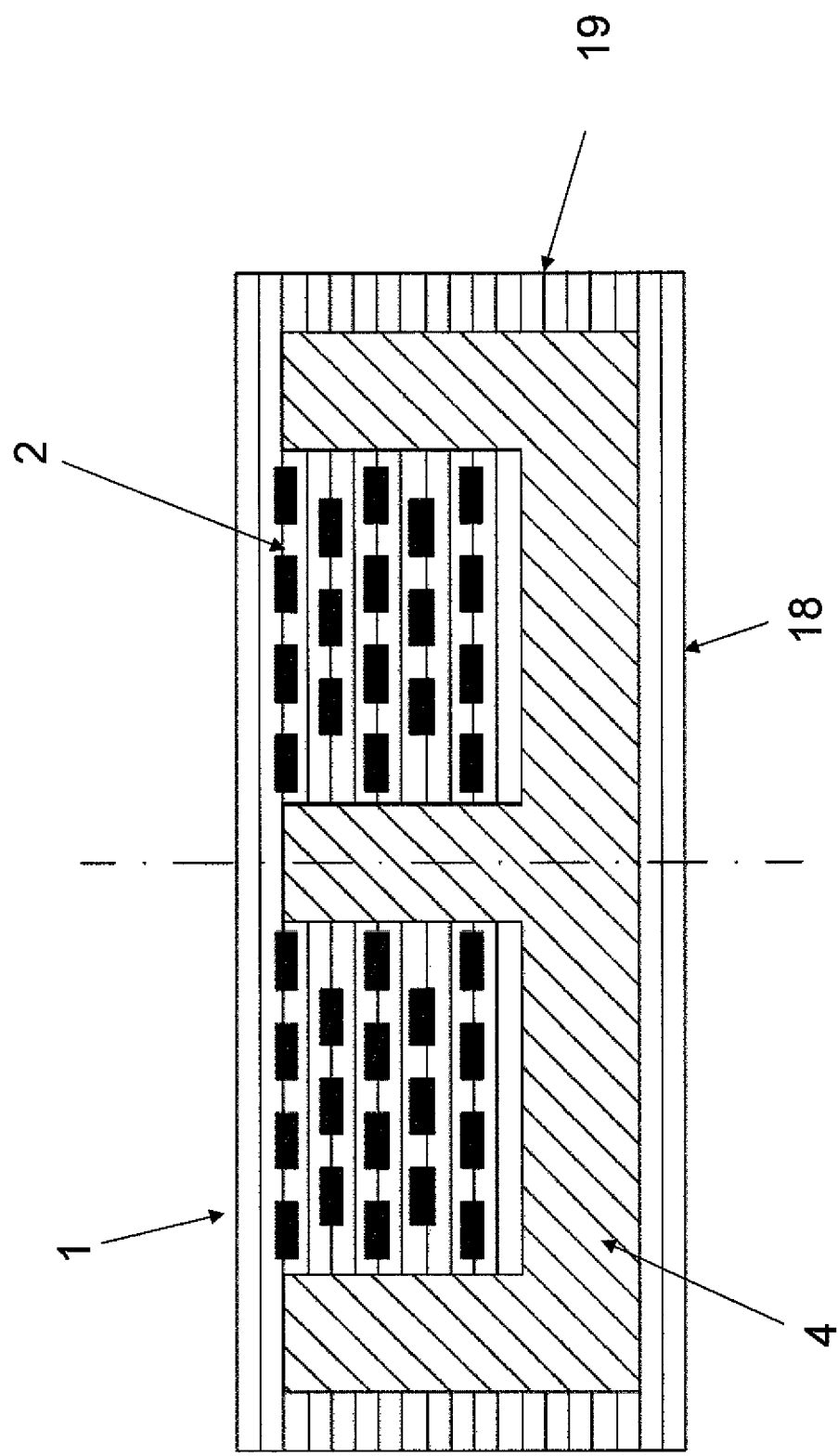
Figure 7:
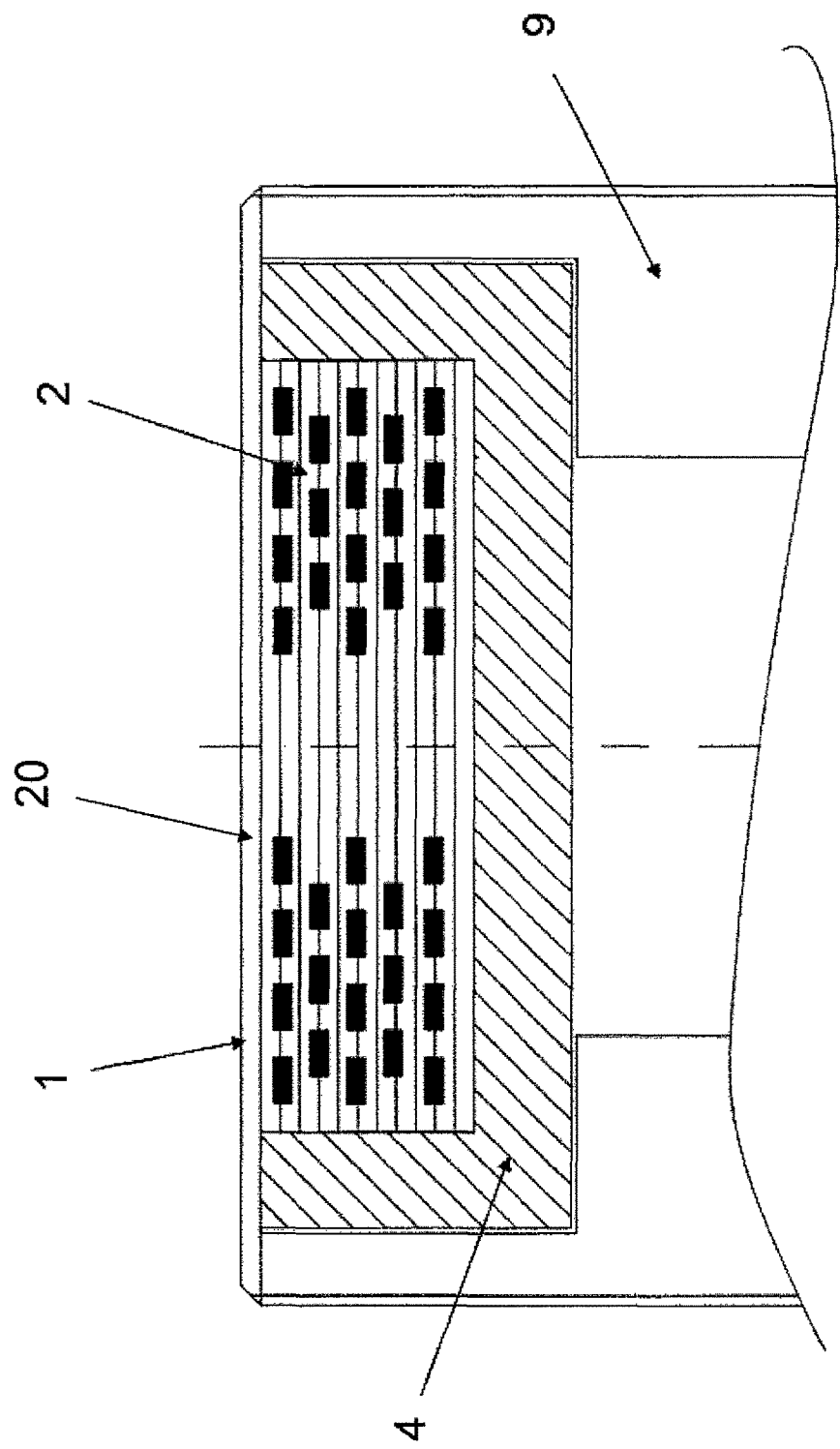

There are various options to implement and further develop the teaching of the present invention in an advantageous manner. For this purpose, on the one hand reference is made to the dependent claims provided herein and on the other hand to the following explanation of preferred exemplary embodiments of the invention using the drawing. In the context of the explanation of preferred exemplary embodiments of the invention using the drawing the teaching of the generally preferred embodiments and further developments of the teaching are also explained. The drawing shows:

FIGS. 1a and 1b in a schematic view an exemplary embodiment of a sensor according to the invention, in which the core is inserted into a recess of the film body, FIG. 1c in a schematic view another exemplary embodiment of the sensor according to the invention in which the coil body with the core is inserted in the core and glued here, FIG. 2 in a schematic view another exemplary embodiment of a sensor according to the invention, in which the core comprises sintered powdered ferrite, with the sintering occurring in a sinter mold with the coil body inserted, FIG. 3 in a schematic view another exemplary embodiment of the sensor according to the invention, with the core comprising several layers of a ceramic film, FIG. 4 in a schematic view another exemplary embodiment of a sensor according to the invention, with the core being connected fixed to a metal housing, FIG. 5 in a schematic view another exemplary embodiment of a sensor according to the invention, with the core being reduced to a cylindrical cross-section in the center of the coil body, FIG. 6 in a schematic view another exemplary embodiment of a sensor according to the invention, with the sensor element, i.e. the coil body and the core being entirely encapsulated, FIG. 7 in a schematic view another exemplary embodiment of the sensor according to the invention, with here the coil body being inserted in a core embodied as a cup core, and FIG. 8 in a schematic view another exemplary embodiment of a sensor according to the invention, with here the coil body comprising a central recess, in which the core is inserted as a pin.

FIG. 1 shows a first exemplary embodiment of an inductive sensor. The coil comprises circuit board tracks in a multi-layered ceramic system. The ceramic is embodied such that in the rear part, i.e. facing away from the front of the sensor element, a recess is provided accepting the ferrite core. The recess is based on the shape of the coil. This may be embodied either circularly or rectangular. Other shapes are also possible, e.g., triangular arrangements. In order to yield a maximum packing density of the coil the circuit board tracks should show a narrow width and a short distance from each other.

In order to increase inductivity even further the ferrite core is inserted into the recess. The shape of the coil and the ferrite core are adjusted to each other such that no air gap develops between the ferrite and the ceramic, to the extent possible. This may represent e.g., a conventional ferrite of sintered powered ferrite, for example a cup core. Other standard forms are also possible for the ferrite core, such as P-cores, PM-cores, or E-cores. It is important that the multi-layered ceramic is adjusted to the shape. Here it must be observed that the ceramic shrinks during sintering, which must be considered when determining the shape.

Another possibility for the core material are materials with particularly high permeability, for example Mu-metal foils that can be stacked onto each other.

The sensor element and the ferrite core may be connected to each other in various ways, e.g., by way of adhesion, compression, molding etc. In order to yield an adjustment of the inductivity during the fastening of the core to the sensor element the inductivity of the coil is measured and the core mounted thereat (e.g., in the depth of a recess) such that the inductivity of the coil reaches a desired value. Alternatively the core may also comprise an adjustment element made from ferromagnetic material, by which the inductivity of the coil is adjusted.

FIG. 2 shows another exemplary embodiment of a sensor according to the invention. Here, the ferrite core is not formed until the production process, in which for example powered ferrite is filled into the recess of the sensor element prior to sintering. It is particularly advantageous for the powdered ferrite to be mixed with glass powder so that during a joint sintering a fixed compound develops between the multi-layered ceramic and the ferrite material. This embodiment is particularly advantageous because this way no gap develops between the sensor element and the core, but rather a compact compound.

FIG. 3 shows another exemplary embodiment of a sensor according to the invention, with here the core being embodied in the form of ferromagnetic films. Such films are similar to the Green-Tapes still flexible in their "green" state and can be embossed into almost arbitrary shapes. Here, circular film stacks are punched, with their dimensions being equivalent to the recess in the sensor element. These ferrite films are jointly sintered with the multi-layered ceramic in the same production step, resulting in a compact element. Instead of ferrite films, other Mu-metal films may also be used.

FIG. 4 shows a particularly advantageous embodiment of a sensor according to the invention. The sensor element is connected fixed to the metal housing of the sensor forming a part of said housing. For example, the metal housing may comprise a ferromagnetic stainless steel. This way, the housing simultaneously serves as the core to increase inductivity and the guidance of flux lines. In order to reduce undesired eddy currents the housing may be provided with radial slots at the areas forming the core. Due to the fact that eddy currents flow circularly around the axis of symmetry of the coil, they are hindered in their expansion by radial interruptions in the core material. This way the coil is less energized, without here the increase in inductivity being considerably reduced.

The sensor element is connected fixed to the housing via active brazing and thus it is hermetically sealed. The contacting of the sensor element to the electronic occurs via metal contacts, which are connected to the ceramics of the sensor element. They extend through the passage in the housing and are sealed in this passage (for example by molding or glazing). At the other side of the passage the metal pins are soldered or welded to the connection wire. This wire connects the sensor element to the electronic, which is also located in the housing. The signal is finally issued via a plug. Here, an integrated cable connection is also possible.

FIG. 5 shows another exemplary embodiment, this time to reduce eddy currents. The core is reduced to a cylindrical cross-section in the center of the sensor element. The sensor element forms the housing cap of the sensor. Additionally, a thread is cut centrally into the core, which can accept a ferromagnetic bolt. This way, the inductivity of the coil can be adjusted very finely by screwing the bolt more or less deeply into the core. The bolt can also represent an adjustment bolt known from prior art.

FIG. 6 shows an entirely encapsulated, hermetically sealed sensor element in which the core, for example made from Kovar, is embedded in the multi-layer ceramic. This way a hermetically sealed, monolithic block develops in which the core is protected from environmental influences as well.

According to the exemplary embodiment according to FIG. 7 the core 2 is embodied in the simplest fashion, namely without any central pin. Rather, the core 2 is embodied as a cup core, with the sensor coil 1 and/or the coil body 2 resting in its recess. The coil body 2 comprises a multi-layer ceramic with wires "baked" between the ceramic layers. The coil body 2 is therefore embodied in the form of a chip without a hole in the center, with the coil body 2 being inserted in the core 4. Additionally, the core 4 may encompass the coil body 2 from the side facing away from the measuring side.

The coil body 2 may also be adhered, compressed, soldered, or otherwise connected to the core 4 in a form-fitting and partially also force-fitting fashion. The contacting of the sensor coil 1 and/or the coil body 2 occurs for example via the connection pins, not shown in the figures, which penetrate through recesses/holes in the core towards the rear into the space for the connections/electronic. For reasons of simplification, a respective illustration has been waived, here.

The unit shown in FIG. 7 forms a compact, monolithic body, which may be installed and/or adjusted in the sensor housing 9 by way of gluing, soldering, shrinking, etc. A facial cover 20 may comprise ceramics, connected fixed to the coil body 2 as early as during the production. Alternatively, a facial cover 20 may be embodied as a metal cover, which is connected fixed to the housing 9, for example also by way of soldering, welding, adhesion etc. Additionally the facial cover 20 may already be a component of the housing 9, with the housing being cut from the rear such that an almost arbitrarily thin cover 20 remains at the measuring side. Additionally, it is possible that the cover 20 is allocated fixed to the coil body 2.

With regards to the exemplary embodiment shown in FIG. 7 it shall further be noted that the omission of the central pin of the core shown in FIGS. 1 through 6 has an at best negligible influence upon the electric features of the sensor. However it is of particular importance that the omission of the pin according to the embodiment of FIG. 7 considerably facilitates the production of particularly very small sensors, namely sensors showing a very small exterior diameter within the scope of increasing miniaturization, for example an exterior diameter of less than 15 mm, to the extent possible less than 12 mm. The coil body 2 used here therefore shows a diameter of approx. only 5 to 6 mm, thus the embodiment shown in FIG. 7 is particularly suitable. This particular suitability also results such that within the scope of such an embodiment it is not required to equip the coil body with a central passage, with its production being extremely difficult with increasing miniaturization. Rather, here a coil body with a monolithic chip form may be used without any passage.

FIG. 8 shows another exemplary embodiment of a sensor according to the invention, with here the coil body 2 comprising a central recess 21, in which the core 4 is inserted in a fixed manner in the form of a pin, namely from the side facing away from the measuring side. In this exemplary embodiment the core 4 is essentially positioned inside the coil body 2.

Particular advantages of the sensor according to the invention can be ultimately summarized as follows:

The sensor element is a compact unit with a continuous, planar ceramic surface, which is temperature resistant, pressure and vacuum resistant, shock and vibration resistant, and robust against soiling or aggressive agents.

The facial side of the sensor elements simultaneously forms the housing and/or the housing lid.

Simple production possible due to the reduction of components.

A reduced installation depth of the coil can be realized. The core moves further towards the front.

No relative movement occurs between the core (sensor housing) and the coil when the parts are connected and/or sintered with each other in a fixed manner.

With regards to additional advantageous embodiments of the sensor according to the invention reference is made to the general part of the description and the attached claims in order to avoid repetitions.

Finally, it shall explicitly be pointed out that the above-described exemplary embodiments of the sensor according to the invention only serve to explain the claimed teaching, however it is not restricted to the exemplary embodiments.

LIST OF REFERENCE CHARACTERS

FIG. 1a:
1: sensor element with ceramic facial area
2: coil system
3: recess for the core
4: core FIG. 1b:
1: sensor element with ceramic facial area
2: coil system
4: core
FIG. 1c:
1: sensor element with ceramic facial area
2: coil system
4: core
5: adhesion of the core to the sensor element
FIG. 2:
1: sensor element with ceramic facial area
2: coil system
6: powdered ferrite
7: sinter mold to accept the powdered ferrite
FIG. 3:
1: sensor element with ceramic facial area
2: coil system
8: ceramic films or Mu-metal foils
FIG. 4:
1: sensor element with ceramic facial area, sensor coil
2: coil system/coil body
9: housing made from metal
10: radial slots (not shown)
11: active brazing connection sensor element-housing
12: contact pin
13: passage in the housing for contact pin
14: connection wire
15: electronics
16: plug
FIG. 5:
1: sensor element with ceramic facial area
2: coil system
4: core
17: adjustment bolt
FIG. 6:
1: sensor element with ceramic facial area
2: coil system
4: core
18: ceramic film on the rear of the sensor element
19: ceramic film laterally at the sensor element
FIG. 7:
1: sensor element
2: coil body
4: core
9: sensor housing, housing
20: facial cover
FIG. 8:
1: sensor element
2: coil body
4: core
21: central recess

The invention claimed is:

1. An inductively operating sensor, particularly for the distance and position measurement of a metallic object, said sensor comprising:
a coil having a coil axis,
at least one of a ferromagnetic core or a ferrite core, and
a sensor element comprising a housing,
wherein:
the coil is embedded in at least one of a single or a multi-layered ceramic,
the coil jointly with the ceramic defines a coil body,
the coil body comprises an open recess,
the core is positioned within the open recess such that at least a portion of the core is not encompassed by the coil,
the coil body and the core are fixedly connected to each other in a form-fitting fashion via the open recess,
the core fully encompasses the coil body around a central axis of the coil body, and
the central axis is parallel to and aligned with the coil axis.

2. A sensor according to claim 1, wherein the coil body is embodied in a sealed fashion and inserted in a core embodied as a cup core.

3. A sensor according to claim 1, wherein:
the open recess of the coil body is a central recess; and
the core at least partially resembles a pin, inserted into the open recess.

4. A sensor according to claim 1, wherein the open recess has at least one of a circular, oval, triangular, or square/rectangular cross-section.

5. A sensor according to claim 1, wherein the core is at least one of pressed, glued, molded, or soldered via active brazing into the recess.

6. A sensor according to claim 1, wherein the core comprises sintered ferromagnetic powder or powdered ferrite and is sintered in situ.

7. A sensor according to claim 6, wherein the powdered ferrite is mixed with glass powder in order to promote the adhesion to the coil body.

8. A sensor according to claim 6, wherein the sinter mold forms the housing or a part of the housing.

9. A sensor according to claim 1, wherein the core is made from a material with high permeability.

10. A sensor according to claim 9, wherein the material is at least one of ferromagnetic films or Mu-metal foils, stacked/layered on top of each other.

11. A sensor according to claim 1, wherein the sensor element forms at least a part of the housing.

12. A sensor according to claim 1, wherein the sensor element is connected to at least one of the housing and the core via active brazing.

13. A sensor according to claim 1, wherein the face of the sensor element is embodied as a planar, continuous ceramic surface.

14. A sensor according to claim 13, wherein the face of the sensor element forms a part of the housing, particularly a housing lid.

15. A sensor according to claim 14, wherein the part of the housing is a housing lid.

16. A sensor according to claim 1, wherein:
the face of the sensor element is an integral component of the sinter-technologically created coil body; and
at least one surface of the sensor, prior to sintering, is specifically shaped according to the superficial features of the object.

17. A sensor according to claim 1, wherein at least one side of the sensor element comprises a ceramic cover.

* * * * *